(12) United States Patent
Kurahashi et al.

(10) Patent No.: US 10,119,848 B2
(45) Date of Patent: Nov. 6, 2018

(54) INSPECTION MACHINE AND ATTACHMENT JIG THEREFOR

(71) Applicant: MITUTOYO CORPORATION, Kanagawa (JP)

(72) Inventors: Yuki Kurahashi, Yokohama (JP); Masaoki Yamagata, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 233 days.

(21) Appl. No.: 15/298,639

(22) Filed: Oct. 20, 2016

(65) Prior Publication Data

US 2017/0115141 A1 Apr. 27, 2017

(30) Foreign Application Priority Data

Oct. 23, 2015 (JP) .................. 2015-209013

(51) Int. Cl.
*G01B 1/00* (2006.01)
*G01D 18/00* (2006.01)
(Continued)

(52) U.S. Cl.
CPC .............. *G01D 18/00* (2013.01); *G01B 1/00* (2013.01); *G01D 11/30* (2013.01); *G01D 13/02* (2013.01); *G01D 13/22* (2013.01)

(58) Field of Classification Search
CPC ........ G01B 11/24; G01B 3/008; G01B 7/012; G01B 11/03; G01B 11/25; G01B 21/042; G01B 7/008; G01B 7/28
(Continued)

(56) References Cited

U.S. PATENT DOCUMENTS 5,201,131 A * 4/1993 Wilkins ................. G01B 5/004
33/1 M
5,768,798 A * 6/1998 Takahashi ............... G01B 3/22
33/556
(Continued)

FOREIGN PATENT DOCUMENTS

JP 4-31531 2/1992
JP 2645576 8/1997
(Continued)

*Primary Examiner* — Yaritza Guadalupe-McCall
(74) *Attorney, Agent, or Firm* — Greenblum & Bernstein, P.L.C.

(57) ABSTRACT

A jig includes three columnar members, a stylus head receiving member, and a jig fixation portion. The second columnar member extends in a Z direction. The first columnar member extends in an X direction and is configured as a cantilever beam protruding in the X direction by having a first end of the first columnar member joined to a first end of the second columnar member. The third columnar member extends in the X direction and is configured as a cantilever beam protruding in the same direction as the first columnar member by having a first end of the third columnar member joined to a second end of the second columnar member. The stylus head receiving member is joined to the third columnar member such that a surface where a stylus head at a forefront end of a spindle of a gauge makes contact faces the first columnar member. The jig fixation portion is provided to the first columnar member so as to be attachable to a measurement spindle of the gauge inspection machine.

11 Claims, 16 Drawing Sheets

(51) Int. Cl.
*G01D 13/02* (2006.01)
*G01D 13/22* (2006.01)
*G01D 11/30* (2006.01)

(58) Field of Classification Search
USPC .......................................................... 33/556
See application file for complete search history.

(56) References Cited

U.S. PATENT DOCUMENTS 6,901,676 B1 * 6/2005 Macke .................... G01B 5/252
33/550
2017/0115141 A1 * 4/2017 Kurahashi ............... G01D 13/02

FOREIGN PATENT DOCUMENTS

| JP | 2002-122402 | 4/2002 |
| JP | 2002-122404 | 4/2002 |

* cited by examiner

STYLUS HEAD POINTING DOWN

STYLUS HEAD POINTING UP

STYLUS HEAD POINTING RIGHT
(SCALE MARKS UP)

STYLUS HEAD POINTING RIGHT
(SCALE MARKS DOWN)

STYLUS HEAD POINTING RIGHT
(SCALE MARKS OUTWARD)

INSPECTION MACHINE AND ATTACHMENT JIG THEREFOR

CROSS-REFERENCE TO RELATED APPLICATIONS

The present application claims priority under 35 U.S.C. § 119 of Japanese Application No. 2015-209013, filed on Oct. 23, 2015, the disclosure of which is expressly incorporated by reference herein in its entirety.

BACKGROUND OF THE INVENTION

1. Field of the Invention

The present invention relates to an attachment jig and a gauge inspection machine used to inspect a gauge. Specifically, the present invention relates to a jig and gauge inspection machine inspecting metrological characteristics of a gauge (such as a dial gauge) in an inverted posture, where a stylus head points upward, when inspecting the gauge.

2. Description of Related Art

A dial gauge is known as an example of a type of comparator. Dial gauges include a spindle-type and a lever-type. FIG. 14 illustrates a spindle-type dial gauge 10. A simplified description of dial gauges follows, with reference to FIG. 14.

The dial gauge 10 includes a cylindrical casing 11, a spindle 15 which is capable of displacing vertically, and a stem 20 projecting from the casing 11. A dial face (display) 12 is provided on a front surface of the casing 11. A gear mechanism (not shown in the drawings) is provided on an interior of the casing 11, the gear mechanism magnifying a displacement of the spindle 15 and transmitting the change to a pointer 13. A stylus head 16 is provided to a bottom end of the spindle 15. The stem 20 slidably supports the spindle 15.

The spindle 15 is inserted through the casing 11, and a top end of the spindle 15 projects from the casing 11. Then, in order to protect the top end portion of the spindle 15, a cap 21 is provided on a lateral surface of the casing 11. FIG. 15 illustrates a state where the cap 21 is separated from the casing 11. A hole, through which the top end portion of the spindle 15 projects, is bored into the lateral surface of the casing 11 (not shown in FIG. 15), and a hollow male threading portion 14 is provided to a circumference of the hole. The cap 21 can be screwed onto the male threading portion 14.

In addition, a stopper screw 18 can be threaded into the top end portion of the spindle 15. The stopper screw 18 includes a flange 19 which flares out from the stopper screw 18. The flange 19 is a stopper for the spindle 15 due to abutting an edge of the hole (more accurately, the edge of the male threading portion 14). The cap 21 is designed with a sufficient inner diameter and depth to allow the stopper screw 18 to move vertically.

In this connection, dial gauge performance is regulated in ISO 463 (http://wvvw.iso.org/iso/home/store/catalogue_ics/catalogue_detail_ics.htm?csnumber=42802) and JISB 7503 (http://kikakurui.com/b7/B7503-2011-01.html). Manufacturers of dial gauges must inspect their products to determine whether the dial gauges satisfy regulation values as stipulated in ISO 463 and JISB 7503. When inspecting dial gauges, indication accuracy, measurement force, and repetition accuracy must be inspected.

Inspecting dial gauges involves a large number of measurement instances, and must be performed repeatedly, which requires a great deal of time and effort. Given this, Applicant (a manufacturer of dial gauges) has already developed gauge inspection machines to enable inspection of dial gauges to be performed efficiently and easily according to a determined inspection rubric (for example, Japanese Patent Laid-open Publication No. H04-31531, Japanese Patent No. 2,645,576, Japanese Patent Laid-open Publication No. 2002-122402, and Japanese Patent Laid-open Publication No. 2002-122404). A simplified summary description of known gauge inspection machines follows. An exterior view of a gauge inspection machine is shown in FIG. 16, and an interior configuration of a gauge inspection machine is shown in FIG. 18. FIG. 17 shows a state where a dial gauge has been arranged on the gauge inspection machine. A gauge inspection machine 100 includes a bracket 110 which securely holds the dial gauge 10. The bracket 110 securely holds the dial gauge 10 by pinching the stem 20 of the dial gauge 10. The dial gauge 10 may come in a variety of sizes, and therefore the bracket 110 is provided so as to be freely raised and lowered so as to change a height position. Specifically, a backboard 120 having a guide rail 121 stands upright on a casing 130, and the bracket 110 can be freely raised and lowered along the guide rail 121. In addition, the bracket 110 can be fixed in a position by operating a handle 111.

The gauge inspection machine 100 includes a measurement spindle 140 provided so as to be capable of advancing and retreating in a vertical direction. As shown in the internal structure depicted in FIG. 18, a motor 131 and a ball screw 132 are installed inside the casing 130. The ball screw 132 advances and retreats in the vertical direction due to drive power of the motor 131. Specifically, the motor drive power turns and stops the ball screw 132, and rotates a nut 133. Accordingly, the ball screw 132 advances and retreats. An amount of advance/retreat of the ball screw 132 can be precisely detected by an encoder 134. A scale of the encoder 134 is provided parallel to the ball screw 132, and a detection head is fixated to the ball screw 132. In addition, a flat stylus head 141 can be threaded into a top end portion of the measurement spindle 140.

An exemplary protocol is introduced in which inspection of the dial gauge 10 is performed using the gauge inspection machine 100. (Please see FIG. 19.) The protocol is intended to inspect how much a measured value shown by the dial gauge 10 differs from a true value. The gauge inspection machine 100 automatically raises the measurement spindle 140 to a point just shy of around 20 mm. From this point, an inspector manually raises the measurement spindle 140, displacing the measurement spindle 140 until the pointer 13 points at 20 mm. (Fine adjustment of the measurement spindle 140 can be performed with a switch 151 or jog dial 152 on a console 150.) A position of the measurement spindle 140 at this time is measured by the encoder 134. The measured value of the encoder 134 is captured and recorded on a computer 160.

The same operation is performed to 30 mm, 40 mm, and so on, and indication accuracy throughout the entire measurement range of the dial gauge 10 is measured. Moreover, in order to determine repetition accuracy, the same protocol is repeated a predetermined number of times throughout the entire measurement range of the dial gauge 10.

The gauge inspection machine 100 can automatically raise and lower the measurement spindle 140, and can precisely measure the amount of displacement of the measurement spindle 140. Therefore, inspection of the dial gauge 10 is understood to be simple and efficient when using the gauge inspection machine 100.

ISO 463 was revised in 2006, and JISB 7503 was revised in 2011. The following was added by way of these revisions. "Metrological characteristics where not indicated by a manufacturer must meet values for MPE and MPL at all positions within a measurement range, in all orientations." A maximum permissible error (MPE) of a dial gauge is a maximum value of an indication error allowed for an indicated value. A permissible limit (MPL) is a threshold value of measurement force permissible by specification for measurement force.

According to this revision, a scenario may arise requiring inspection as to whether a regulation value is met even in an orientation other than the typical downward pointing posture of the stylus head. A representative example may be imagined of a scenario where a user desires the ability to take a measurement even in an orientation other than the downward pointing posture of the stylus head, for example. Accordingly, manufacturers require a strategy to enable inspection of a dial gauge even in an orientation other than the downward pointing posture of the stylus head.

SUMMARY OF THE INVENTION

The present invention has been developed in view of the above-noted circumstances, and enables simple and accurate inspection in an inverse posture where a stylus head points upward when inspecting a gauge.

A jig according to one aspect of the present invention is an inverse posture inspection jig arranging a gauge on a gauge inspection machine in an inverse posture so as to enable accuracy of the gauge in the inverse posture to be inspected using the gauge inspection machine based on a display value of the gauge when a measurement spindle, provided to the gauge inspection machine so as to be freely raised and lowered, is displaced to a predetermined position. The jig includes a first columnar member extending in a first direction; a second columnar member; and a third columnar member. The second columnar member extends in a second direction orthogonal to the first direction and is configured as a cantilever beam protruding in the second direction by having a first end of the second columnar member joined to a first end of the first columnar member. The third columnar member extends in the second direction and is configured as a cantilever beam protruding in the same direction as the second columnar member by having a first end of the third columnar member joined to a second end of the first columnar member. The jig also includes a stylus head receiving member joined to the third columnar member such that a surface where a stylus head at a forefront end of a spindle of the gauge makes contact faces the second columnar member. The jig also includes a jig fixation portion provided to the second columnar member and configured so as to be attachable to the measurement spindle.

According to another aspect of the present invention, a direction in which the measurement spindle displaces on the jig is preferably the first direction.

According to another aspect of the present invention, the surface of the stylus head receiving member where the stylus head makes contact is preferably a flat surface.

According to another aspect of the present invention, the surface of the stylus head receiving member where the stylus head makes contact is preferably a curved surface that is concave with respect to the stylus head.

According to another aspect of the present invention, a curvature of the curved surface is preferably the reciprocal of a distance between the jig fixation portion and the curved surface.

According to another aspect of the present invention, the surface of the stylus head receiving member where the stylus head makes contact is preferably configured by an inner circumferential surface of a cylinder.

According to another aspect of the present invention, a center axis of the cylinder is preferably orthogonal to the first direction and the second direction.

According to another aspect of the present invention, the surface of the stylus head receiving member where the stylus head makes contact is preferably configured by a spherical surface.

According to another aspect of the present invention, the jig preferably further includes a fourth columnar member extending in the first direction, and the first to fourth columnar members preferably configure a single annular member in which a second end of the second columnar member is joined to a first end of the fourth columnar member and a second end of the third columnar member is joined to a second end of the fourth columnar member.

According to another aspect of the present invention, the stylus head receiving member and the jig fixation portion are preferably arranged at center positions of the first columnar member and the fourth columnar member.

According to another aspect of the present invention, a gauge inspection machine is configured to be capable of displacing a spindle of a gauge, the gauge inspection machine inspecting accuracy of the gauge based on a display value of the gauge when the spindle of the gauge is displaced. The gauge inspection machine includes a measurement spindle provided so as to be freely raised and lowered, the measurement spindle displacing the spindle of the gauge; and an inverse posture inspection jig arranging the gauge on the gauge inspection machine in an inverse posture so as to enable inspection of the accuracy of the gauge in the inverse posture. The jig includes a first columnar member extending in a first direction; a second columnar member; and a third columnar member. The second columnar member extends in a second direction orthogonal to the first direction and is configured as a cantilever beam protruding in the second direction by having a first end of the second columnar member joined to a first end of the first columnar member. The third columnar member extends in the second direction and is configured as a cantilever beam protruding in the same direction as the second columnar member by having a first end of the third columnar member joined to a second end of the first columnar member. The jig also includes a stylus head receiving member joined to the third columnar member such that a surface where a stylus head at a forefront end of the spindle of the gauge makes contact faces the second columnar member. The jig also includes a jig fixation portion provided to the second columnar member and configured so as to be attachable to the measurement spindle.

According to the present invention, simple and accurate inspection in an inverse posture where a stylus head points upward is possible when inspecting a gauge.

The present invention is clarified by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
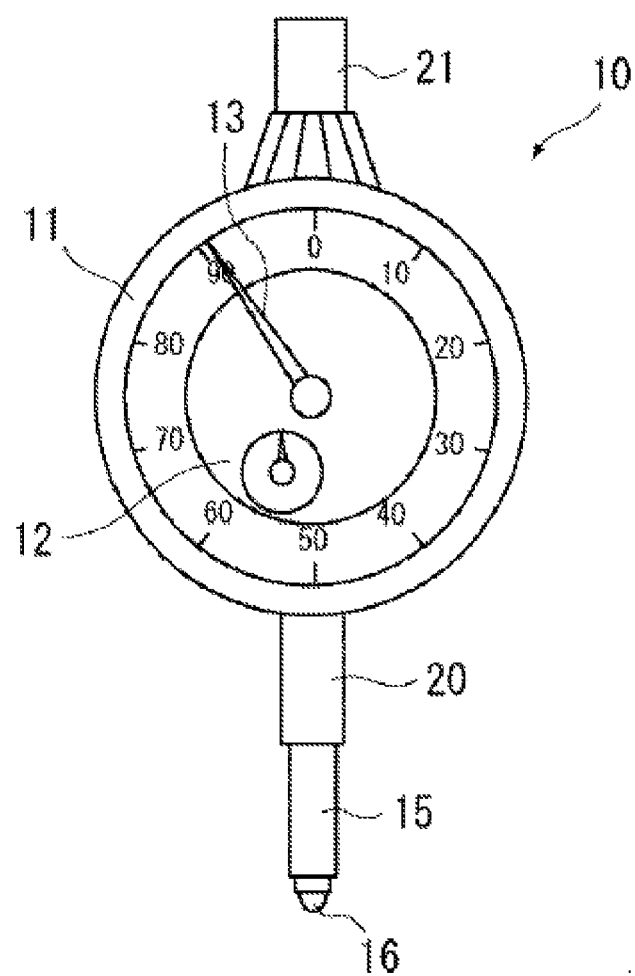
FIG. 1 illustrates an inspection posture of a dial gauge.
Figure 2:
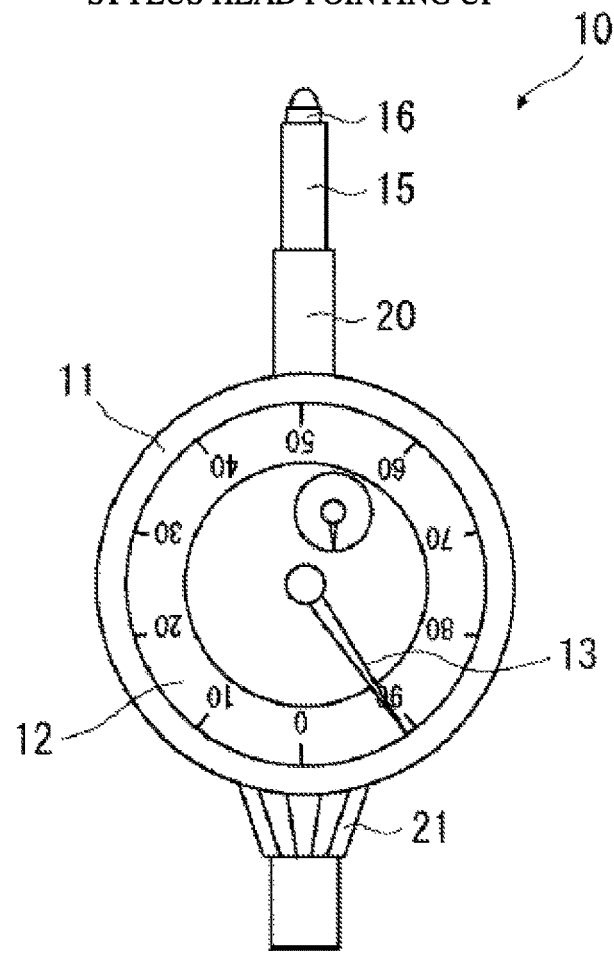
FIG. 2 illustrates an inspection posture of the dial gauge.
Figure 3:
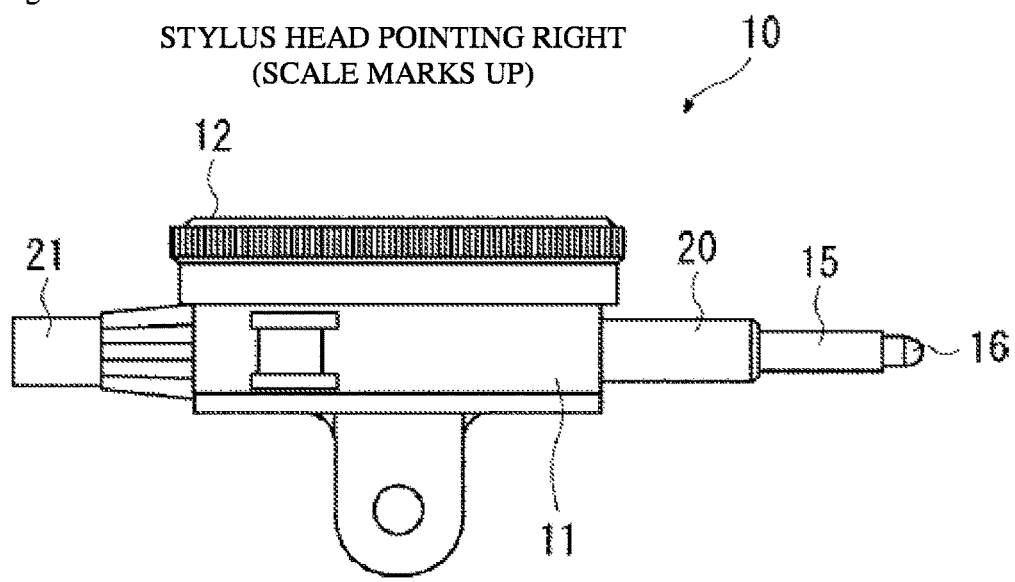
FIG. 3 illustrates an inspection posture of the dial gauge.
Figure 4:
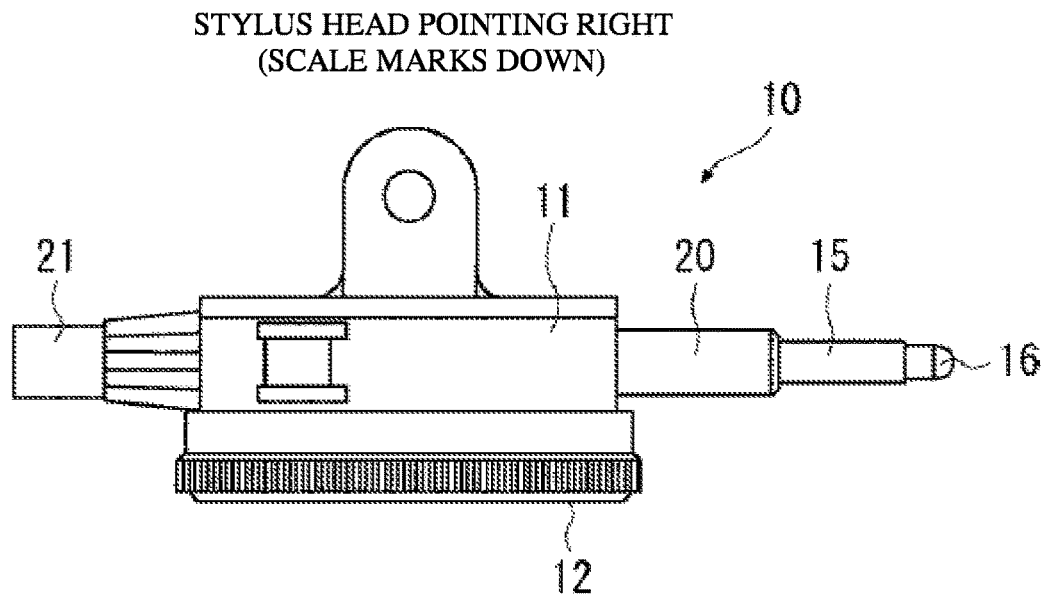
FIG. 4 illustrates an inspection posture of the dial gauge.
Figure 5:
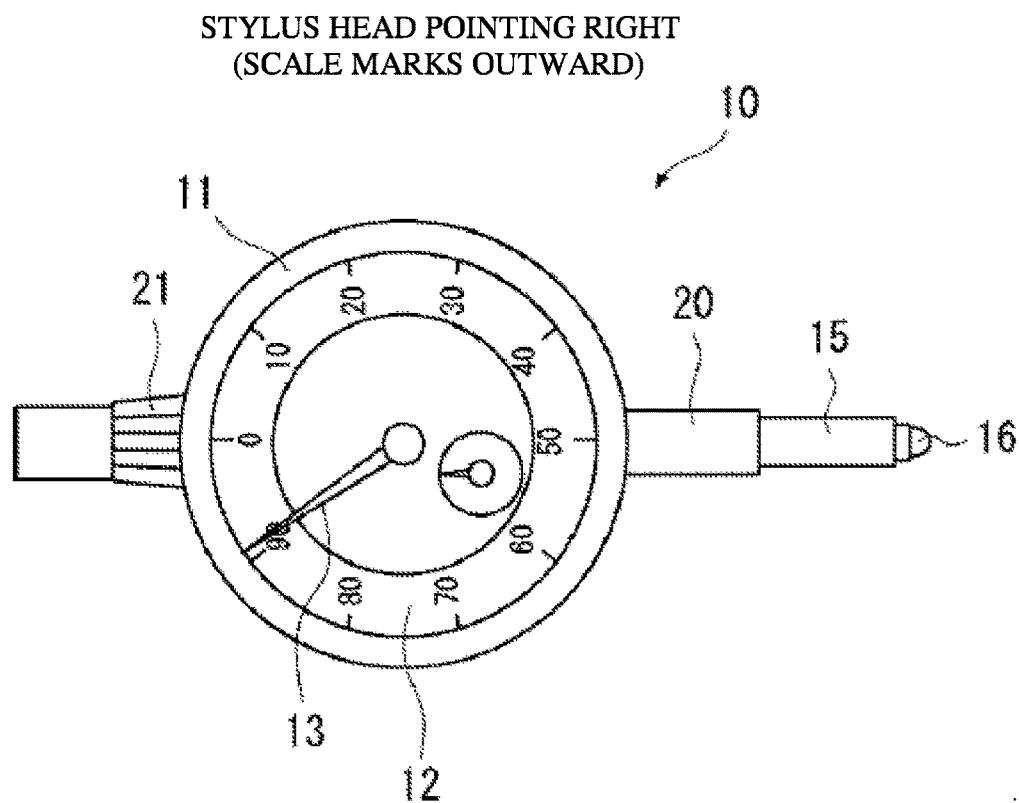
FIG. 5 illustrates an inspection posture of the dial gauge.
Figure 6:
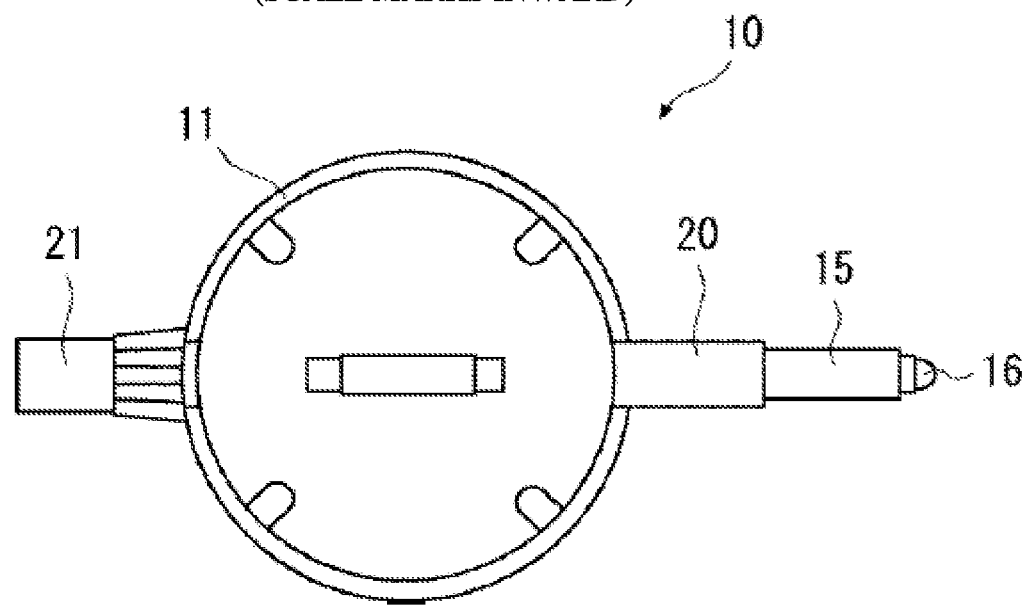
FIG. 6 illustrates an inspection posture of the dial gauge.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the plurality of drawings, and duplicative descriptions are omitted where necessary.

First Embodiment

In ISO and JIS standards, metrological characteristics of dial gauges are subject to regulation as "metrological characteristics where not indicated by a manufacturer must meet values for MPE and MPL . . . in all orientations." Accordingly, in a case where a user has a specific requirement, for example, there is a need to perform inspection in a posture other than a normal posture (stylus head pointing down).

Considering an internal structure and the like of a dial gauge 10, inspection postures that may be required can be divided into the following six patterns. The six patterns of inspection postures are described below with reference to FIGS. 1 to 6.

(A) Stylus head pointing down (normal posture)
(B) Stylus head pointing up (inverse posture)
(C) Stylus head pointing right (where scale marks point up)
(D) Stylus head pointing right (where scale marks point down)
(D) Stylus head pointing right (where scale marks point toward user)
(D) Stylus head pointing right (where scale marks point away from user)

In the instant specification, "toward user" may also be referred to as "front," "forward," or "outward" and "away from user" may also be referred to as "rear," "rearward," or "inward."

Inspection must be performed in at least one of these six patterns, in accordance with the posture employed by the user. Obviously, in the present embodiment, inspecting the dial gauge 10 with "(A) Stylus head pointing down" can be done with a conventional method identical to those described in the prior art. Accordingly, a description of inspection with "(A) Stylus head pointing down" is omitted.

Figure 7:
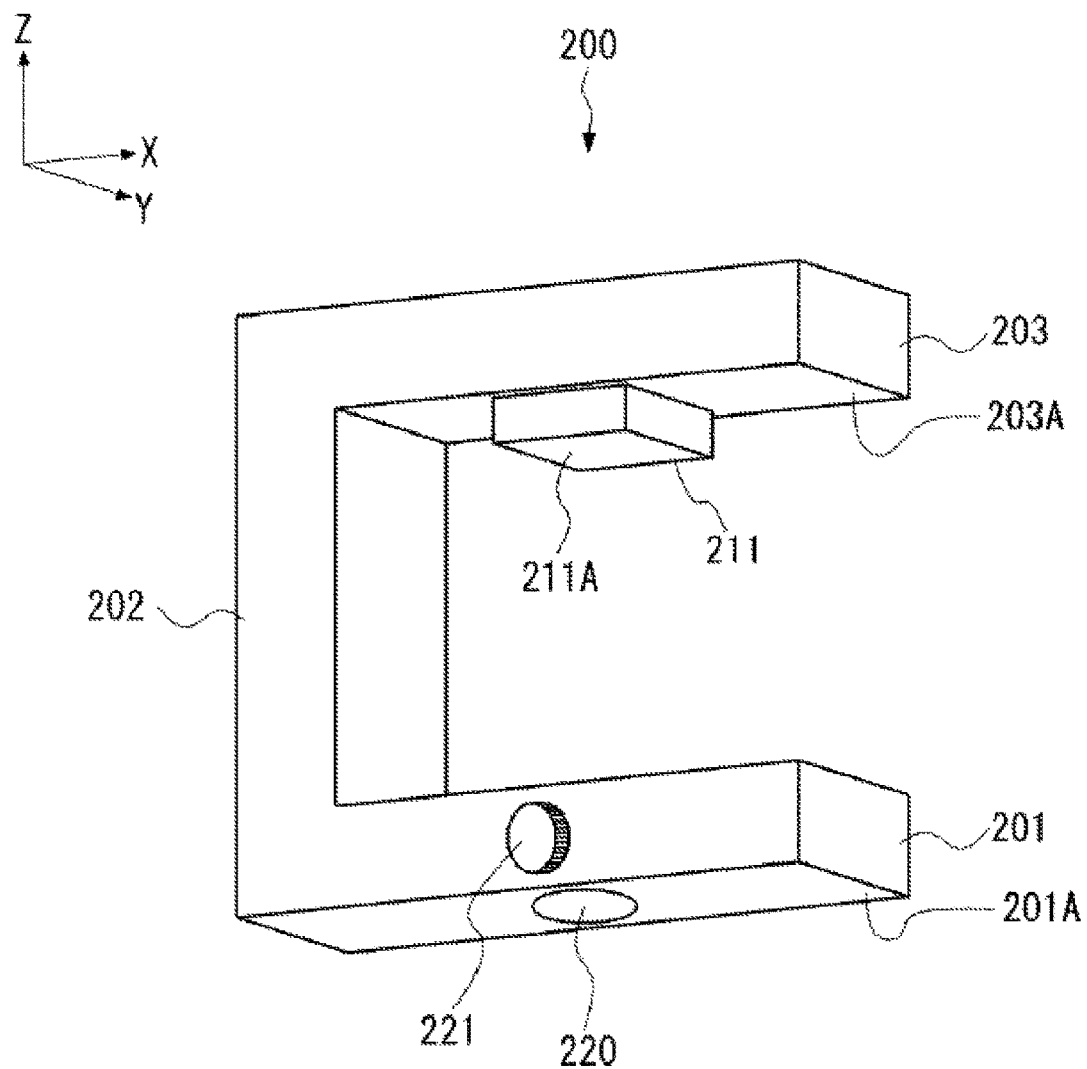
FIG. 7 schematically illustrates a configuration of an inverse posture jig according to a first embodiment.

A description is provided of inspection conducted in the (B) inverse posture (hereafter referred to as inverse posture inspection) according to the present embodiment. In the present embodiment, a jig is used to arrange the dial gauge 10 in the inverse posture on the gauge inspection machine 100 in order to perform the inverse posture inspection. FIG. 7 is a perspective view schematically illustrating a configuration of an inverse posture inspection jig 200 according to the first embodiment.

In the following, the configuration of the jig is described using three mutually orthogonal directions, X, Y, and Z. The X direction may also be referred to as a second direction, and the Y direction may also be referred to as a first direction.

The inverse posture inspection jig 200 includes columnar members 201 to 203, a stylus head receiving member (also referred to as a stylus head receiver) 211, a jig fixation hole 220, and a clamp screw 221. The columnar members 201 to 203 and the stylus head receiving member 211 are configured with iron, for example.

The columnar members 201 to 203 are configured as quadrilateral columnar members having, for example, a rectangular shape in a cross-sectional plane (Y-Z plane) perpendicular to a length direction (X direction). In the following, the columnar member 201 may also be referred to as a second columnar member, the columnar member 202 may also be referred to as a first columnar member, and the columnar member 203 may also be referred to as a third columnar member.

The columnar member 201 is a member extending in a horizontal direction (the X direction). The columnar member 202 is a member extending in a vertical direction (Z direction), and a lower (Z(−) side) end portion thereof is joined with the columnar member 201. The columnar member 203 is a member extending in the same direction as the columnar member 201 (X(+) direction in FIG. 7), and is joined with an upper (Z(+) side) end portion of the columnar member 202. Specifically, the inverse posture inspection jig 200 has a configuration in which two cantilever beams (columnar members 201 and 203) project in the same horizontal direction (X(+) direction) from the columnar member 202, which extends in the vertical (Z) direction.

The stylus head receiving member 211 is a member attached to a surface 203A on a vertical direction lower side (Z(−) side) of the columnar member 203. In the present embodiment, the stylus head receiving member 211 is configured as a rectangular parallelepiped. A stylus head 16 of the dial gauge 10 makes contact with a surface 211A on the vertical direction lower side (Z(−) side) of the stylus head receiving member 211.

The jig fixation hole 220 is formed as a hole bored through the columnar member 201 in the vertical (Z) direction, through which a measurement spindle 140 of the gauge inspection machine 100 can be inserted. Specifically, a diameter of the jig fixation hole 220 can be understood to be larger than a diameter of the measurement spindle 140 of the gauge inspection machine 100.

Figure 8:
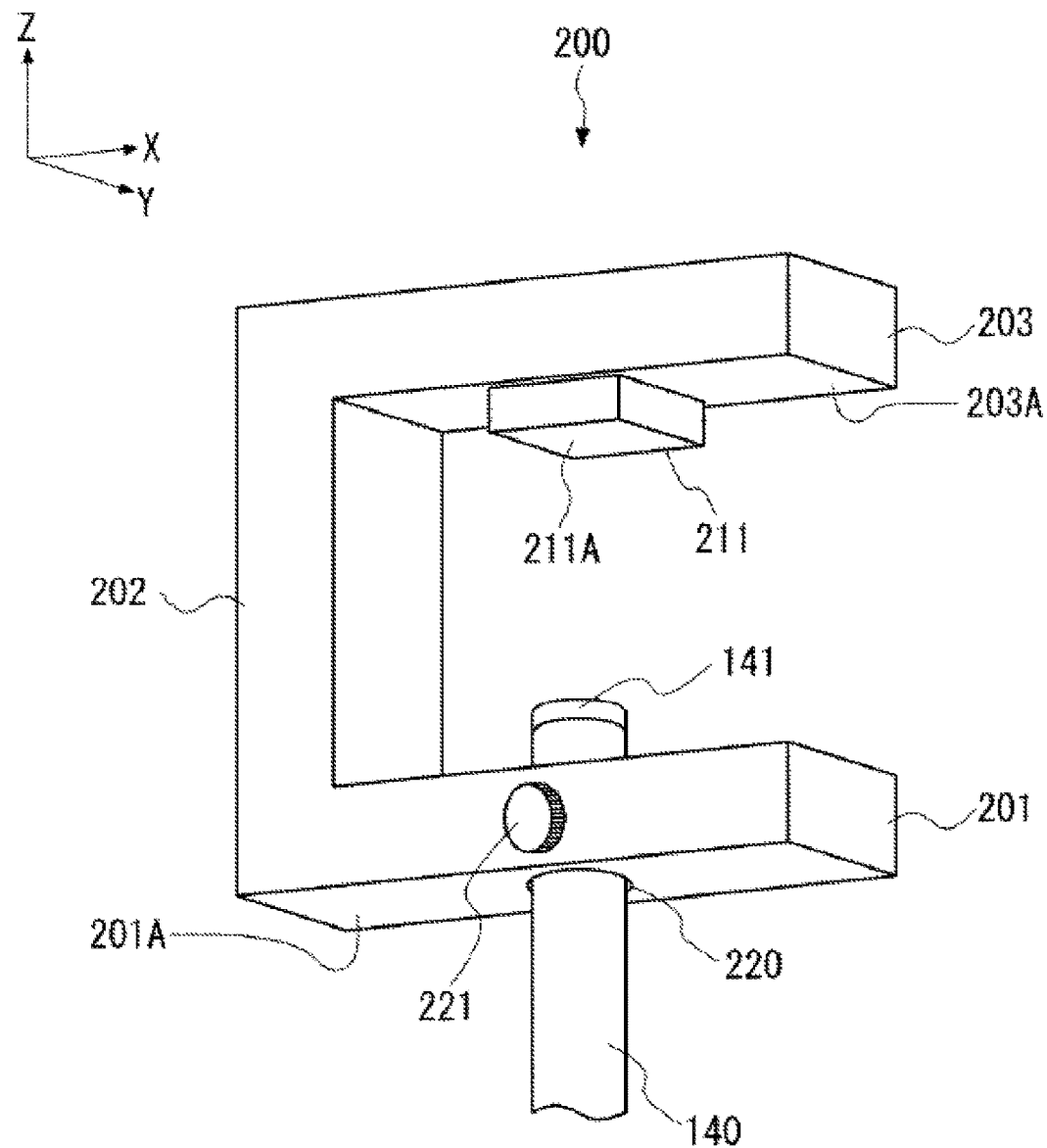
FIG. 8 is a perspective view illustrating the inverse posture jig according to the first embodiment, fixated to a measurement spindle of a gauge inspection machine.
Figure 9:
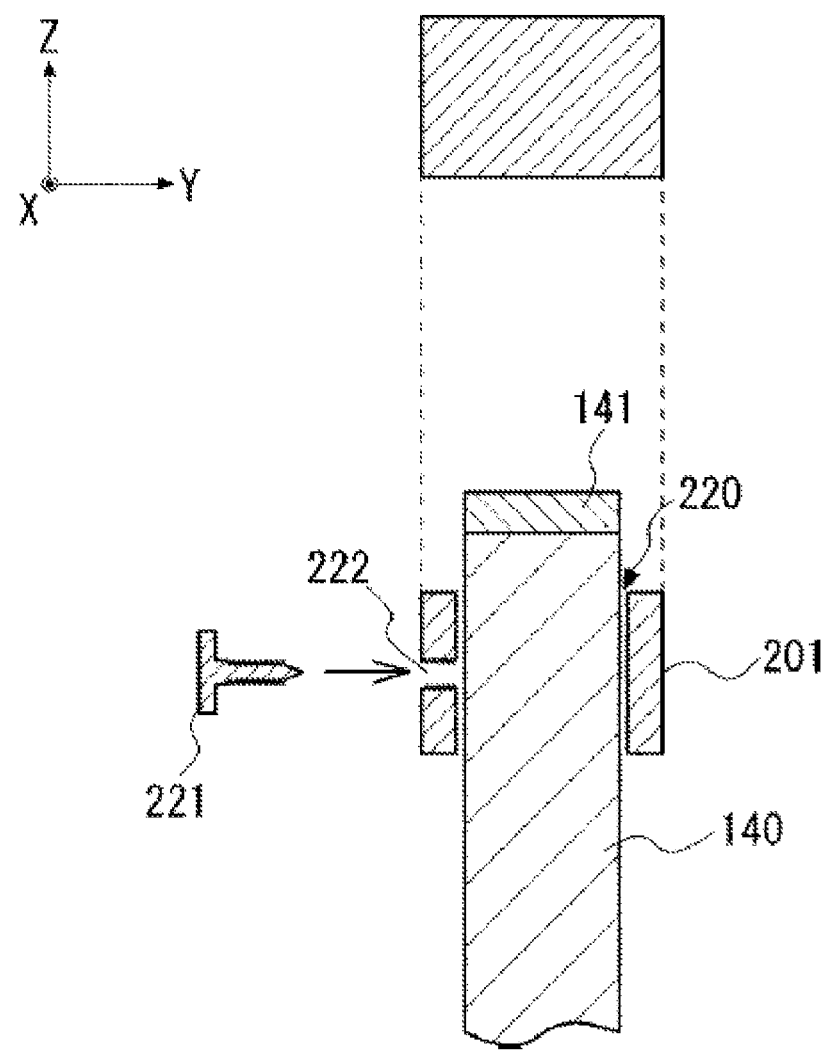
FIG. 9 is an exploded cross-sectional view on a Y-Z plane of the inverse posture jig according to the first embodiment.

FIG. 8 is a perspective view illustrating the inverse posture jig 200 fixated to the measurement spindle 140 of the gauge inspection machine 100. FIG. 9 is an exploded cross-sectional view on the Y-Z cross-sectional plane of the inverse posture jig 200. The flat stylus head 141 is mounted to a forefront end of the measurement spindle 140 and the measurement spindle 140 is inserted into the jig fixation hole 220 through the surface 201A on the vertical direction lower side (Z(−) side) of the columnar member 201. A screw hole 222 is bored into the columnar member from a Y(−) side through to the jig fixation hole 220. Female threading is provided on an interior surface of the screw hole 222. Then, the clamp screw 221 is threaded into the screw hole 222 and pressure is applied to the measurement spindle 140 with the clamp screw 221, which enables the inverse posture inspection jig 200 to be readily fixated to the measurement spindle 140.

A description is given above of an example where the flat stylus head 141 is mounted to the forefront end of the measurement spindle 140, but this description is merely exemplary. A case is also possible in which the flat stylus head 141 is not mounted to the forefront end of the measurement spindle 140, or a different stylus head is mounted.

A description is given above of an example where the clamp screw 221 is threaded in from the Y(−) side. However, so long as the clamp screw 221 can be threaded into the screw hole 222, the clamp screw 221 may instead be threaded in from the Y(+) side, or from the X(+) side or X(−) side.

The jig fixation hole 220, clamp screw 221, and screw hole 222 described above may also be referred to as a jig fixation portion or jig fixator provided to the columnar member 201. However, this jig fixation portion is merely exemplary and, so long as the inverse posture inspection jig 200 can be fixated to the measurement spindle 140 of the gauge inspection machine 100, other configurations may also be used.

Figure 10:
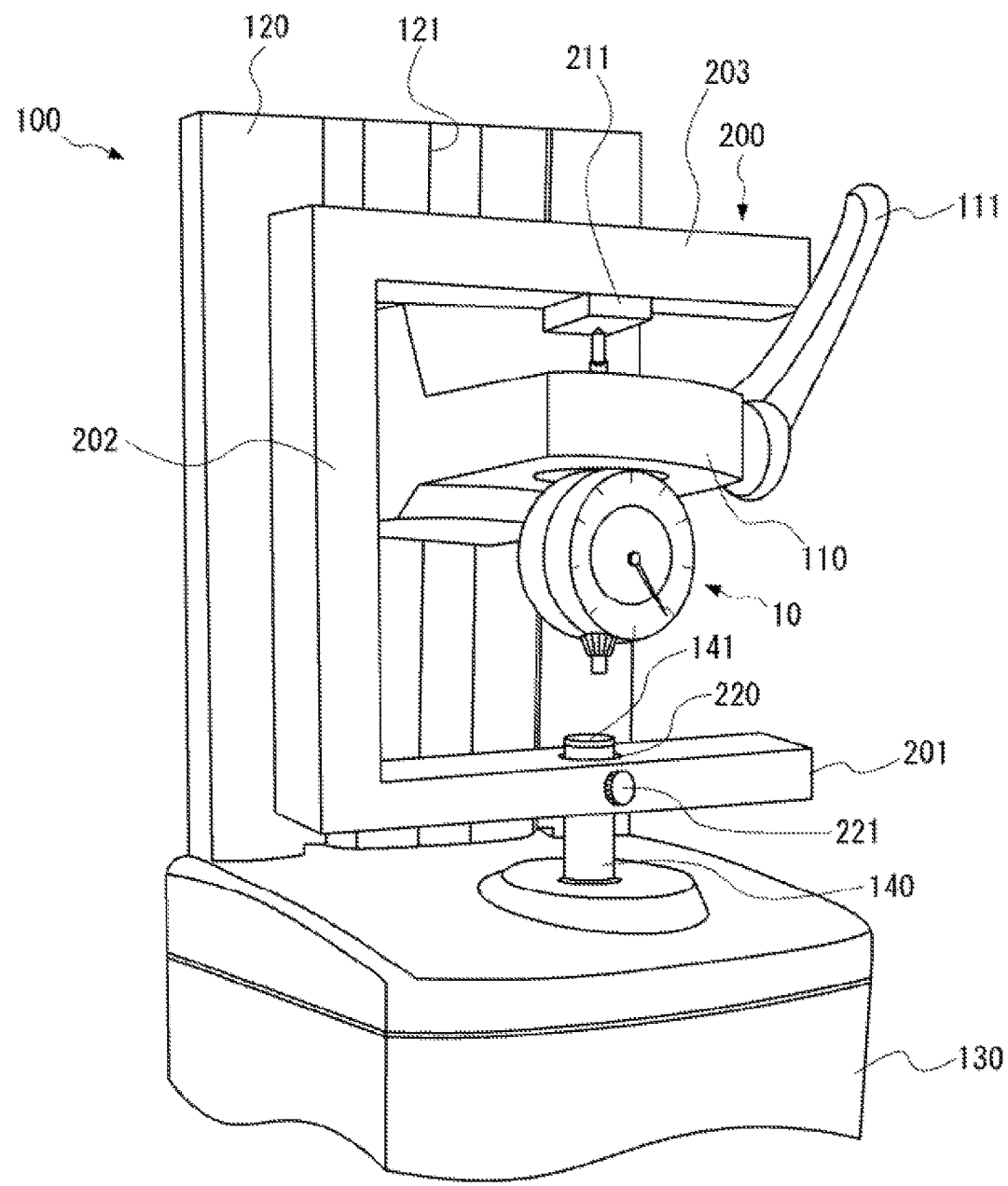
FIG. 10 illustrates a use posture of the jig according to the first embodiment.
Figure 16:
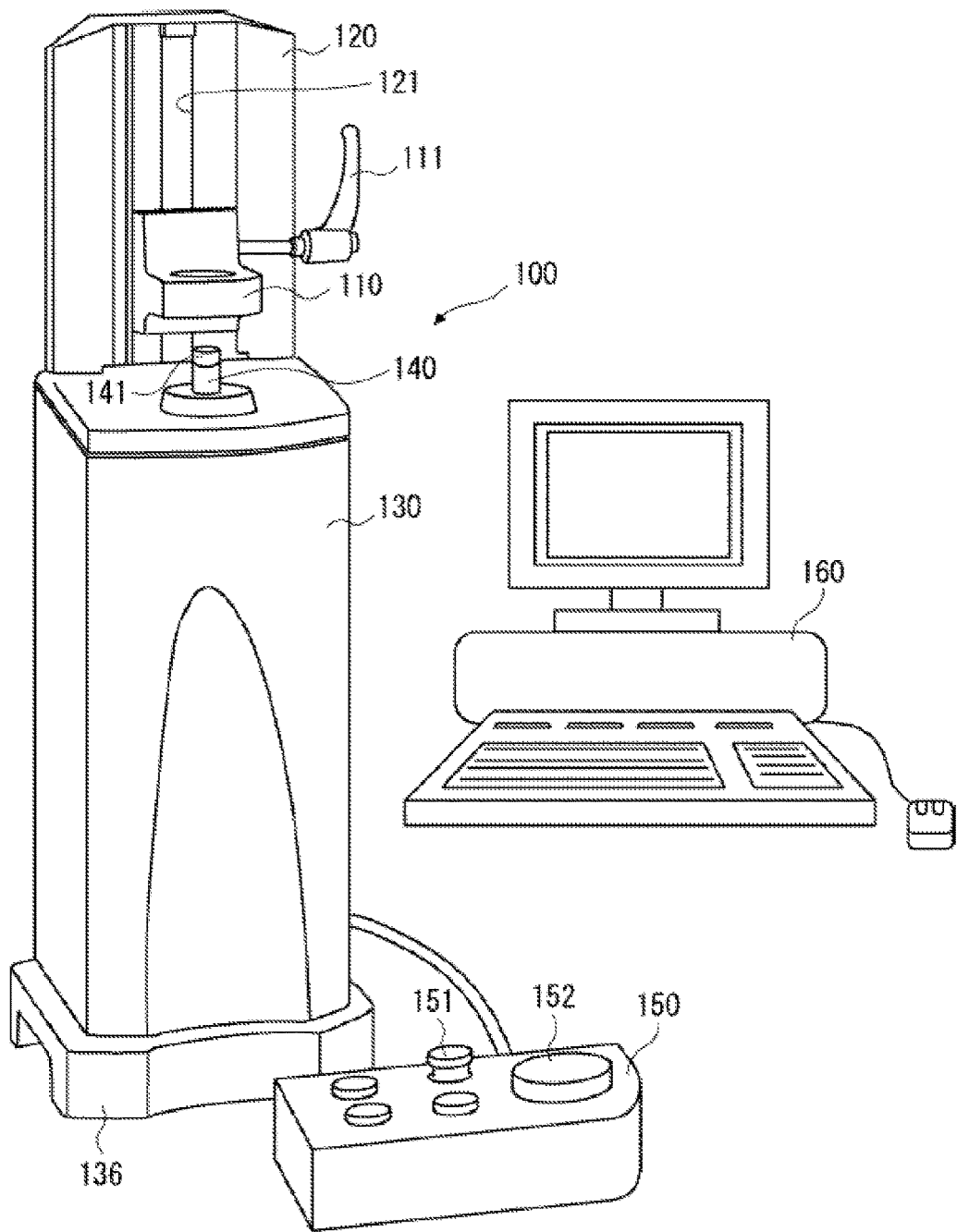
FIG. 16 illustrates the gauge inspection machine.
Figure 17:
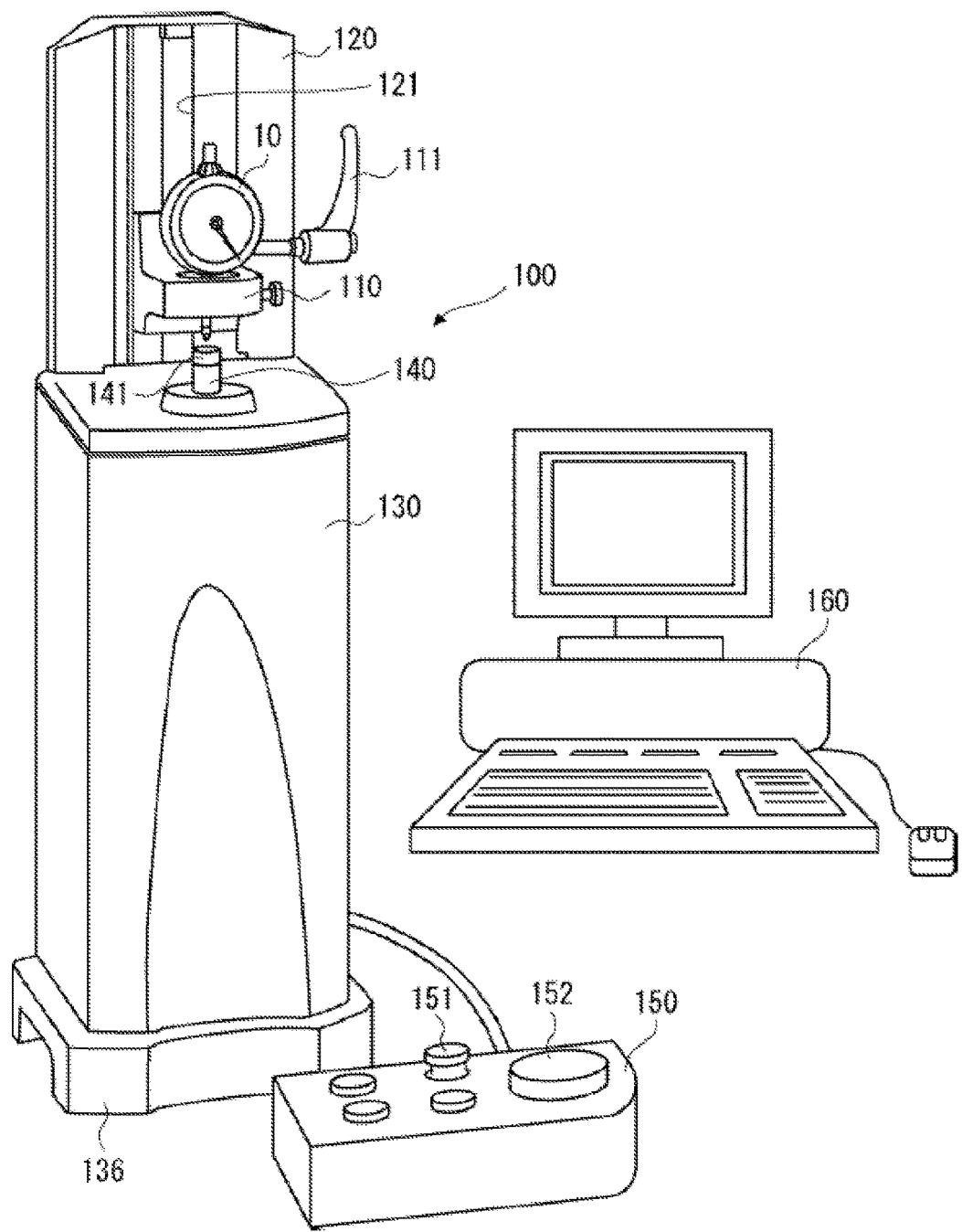
FIG. 17 illustrates the gauge inspection machine.
Figure 18:
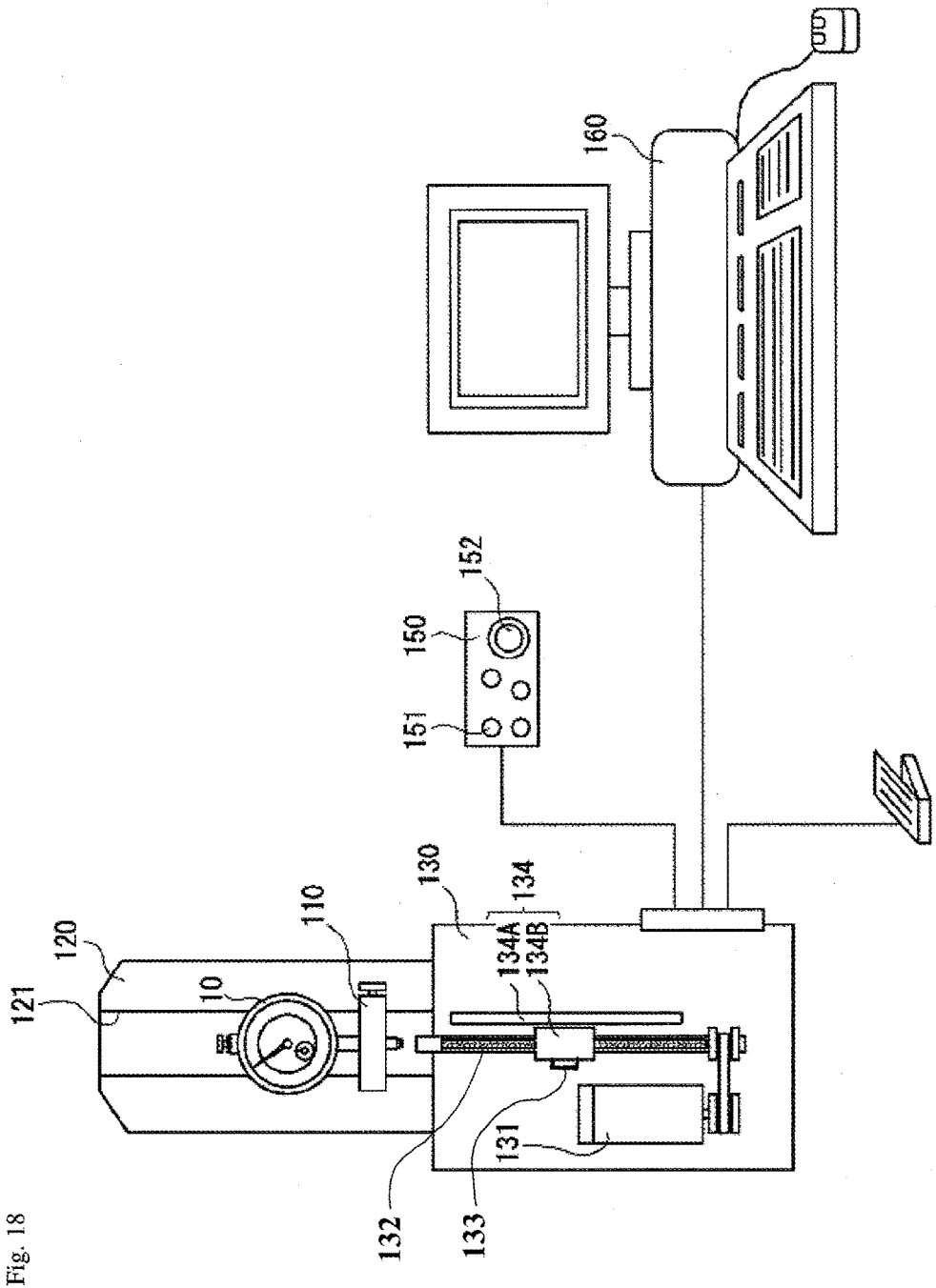
FIG. 18 illustrates the gauge inspection machine.
Figure 19:
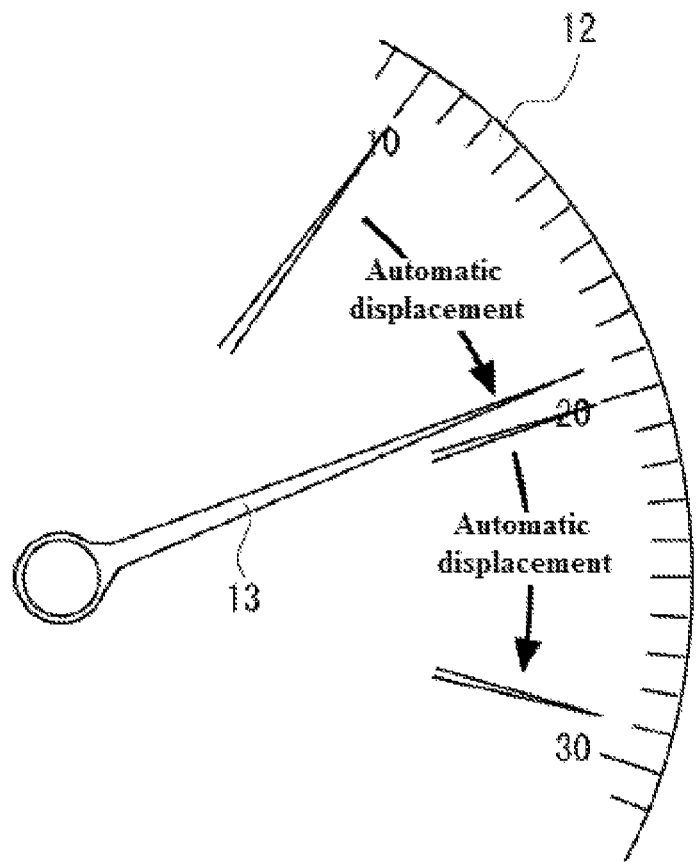
FIG. 19 is an explanatory diagram of an exemplary method of inspection of the dial gauge.

FIG. 10 illustrates the inverse posture jig 200 in use. The configuration of a main body of the gauge inspection machine 100 is similar to a configuration depicted in FIG. 16, and therefore a description thereof is omitted. The dial gauge 10 is set in the inverse posture on the gauge inspection machine 100 using the inverse posture inspection jig 200. Specifically, the measurement spindle 140 of the gauge inspection machine 100 is passed through the jig fixation hole 220 in an inverted orientation, the clamp screw 221 is threaded into the screw hole 222, and the inverse posture inspection jig 200 is fixated to the measurement spindle 140. At this point, although the orientation of a site on the dial gauge 10 that is fixated to a bracket 110 is inverted, the site is similar to that in detection in the normal orientation. Accordingly, as shown in FIG. 10, when the jig 200 is used, the dial gauge 10 can be arranged on the gauge inspection machine 100 in the inverse posture and, except that the posture is inverted, effects on inspection results can be minimized.

When arranging the dial gauge 10 in the inverse posture on the gauge inspection machine 100, the bracket 110 is of course displaced sufficiently upward so as to prevent the bracket 110 from interfering.

When the dial gauge 10 is arranged in the inverse posture on the gauge inspection machine 100 in this way, inspection of the dial gauge 10 can thereafter be carried out with a protocol significantly similar to protocols described in the prior art. When the measurement spindle 140 of the gauge inspection machine 100 is raised and lowered, the dial gauge 10 is also raised and lowered integrally with the measurement spindle 140. When the stylus head 16 makes contact, a spindle 15 is pressed inward. Indication accuracy and repetition accuracy at this moment are measured. In this way, by arranging the dial gauge 10 in the inverse posture on the gauge inspection machine 100 using the inverse posture inspection jig 200, inspection of the dial gauge 10 in the inverse posture ((B) stylus head pointing up) can be performed using the gauge inspection machine 100.

According to the present configuration, by using the inverse posture inspection jig 200 having the simple configuration described above, inspection of a dial gauge held vertically inverted can be performed readily without devising any special measures such as altering the posture of the inspection machine itself. In addition, by swapping out a mechanism fixating to the spindle of the inverse posture inspection jig 200, the inverse posture inspection jig 200 can be applied to a variety of inspection machines having spindles of different shapes. Also, the site on the dial gauge which comes in contact with the inspection machine so as to fixate the dial gauge to the inspection machine is similar to a case where the dial gauge is inspected in the normal orientation. Therefore, differences in measurement conditions from those of the normal orientation can be absolutely minimized.

Second Embodiment

Figure 11:
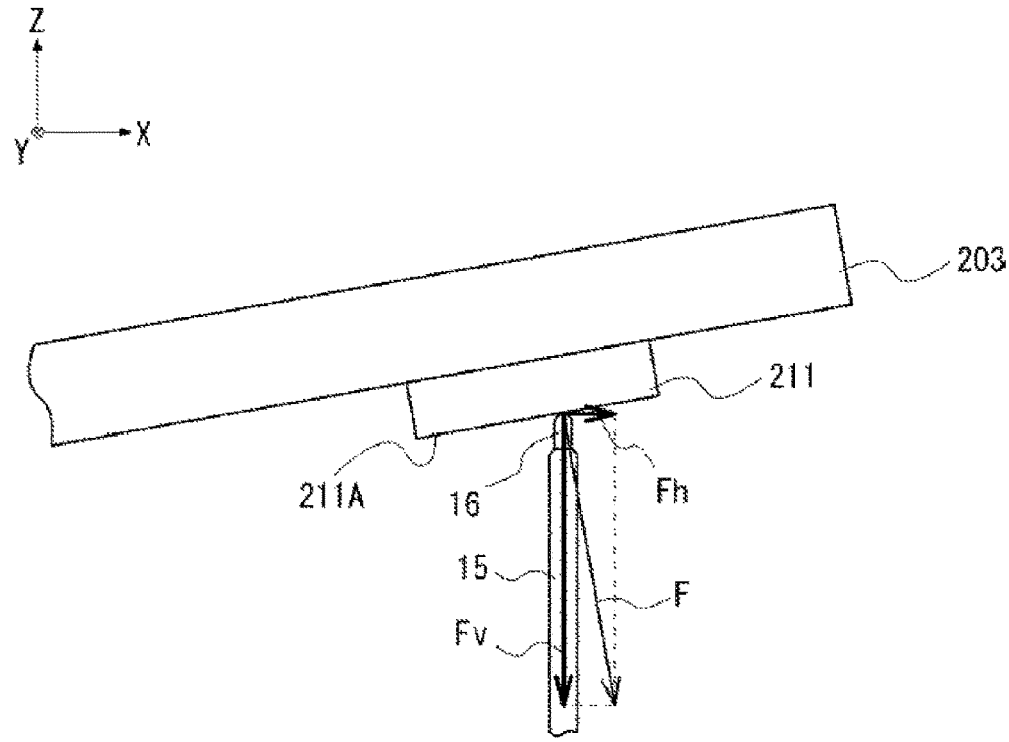
FIG. 11 is a partially enlarged view schematically illustrating a positional relationship of the jig and a spindle of the dial gauge according to the first embodiment.

In the first embodiment, there may be cases where an axis of the spindle 15 of the dial gauge 10 is not orthogonal to the surface on the vertical direction lower side (Z(−) side) of the stylus head receiving member 211. FIG. 11 is a partially enlarged view schematically illustrating a positional relationship of the inverse posture inspection jig 200 and the spindle 15 of the dial gauge 10 according to the first embodiment. As shown in FIG. 11, the dial gauge 10 is fixated such that the axis of the spindle 15 of the dial gauge 10 aligns with the vertical direction. However, when the stylus head receiving member 211 displaces toward the vertical direction lower side and presses against the spindle 15 of the dial gauge 10, the stylus head receiving member 211 receives a reactive force from the spindle 15 of the dial gauge 10. In the inverse posture inspection jig 200, the columnar members 201 to 203 have elasticity determined by the material of which they are composed. Therefore, due to a reactive force from the stylus head 16, flexure develops in the inverse posture inspection jig 200 with the jig fixation hole 220 as a fixation point, the columnar member 201 being fixated to the measurement spindle 140 of the gauge inspection machine 100 at the jig fixation hole 220.

When effects on an area near the stylus head receiving member 211 due to this phenomenon are investigated, the stylus head receiving member 211 rotates in a counterclockwise direction as the stylus head receiving member 211 displaces toward the vertical direction lower side (Z(−) side). As a result, the surface 211A on the vertical direction lower side (Z(−) side) of the stylus head receiving member 211 is no longer perpendicular to the axis of the spindle 15 of the dial gauge 10, and a force F with which the stylus head receiving member 211 presses against the stylus head 16 of the dial gauge 10 is split into a vertical downward force Fv and a horizontal direction force Fh. In other words, as the stylus head receiving member 211 displaces vertically downward, a vertically downward (Z(−) direction) pressing force applied to the spindle 15 of the dial gauge 10 decreases. As a result, inspection accuracy may deteriorate due to fluctuation in the pressing force applied to the spindle 15 of the dial gauge 10 due to an amount of displacement of the stylus head receiving member 211.

Figure 12:
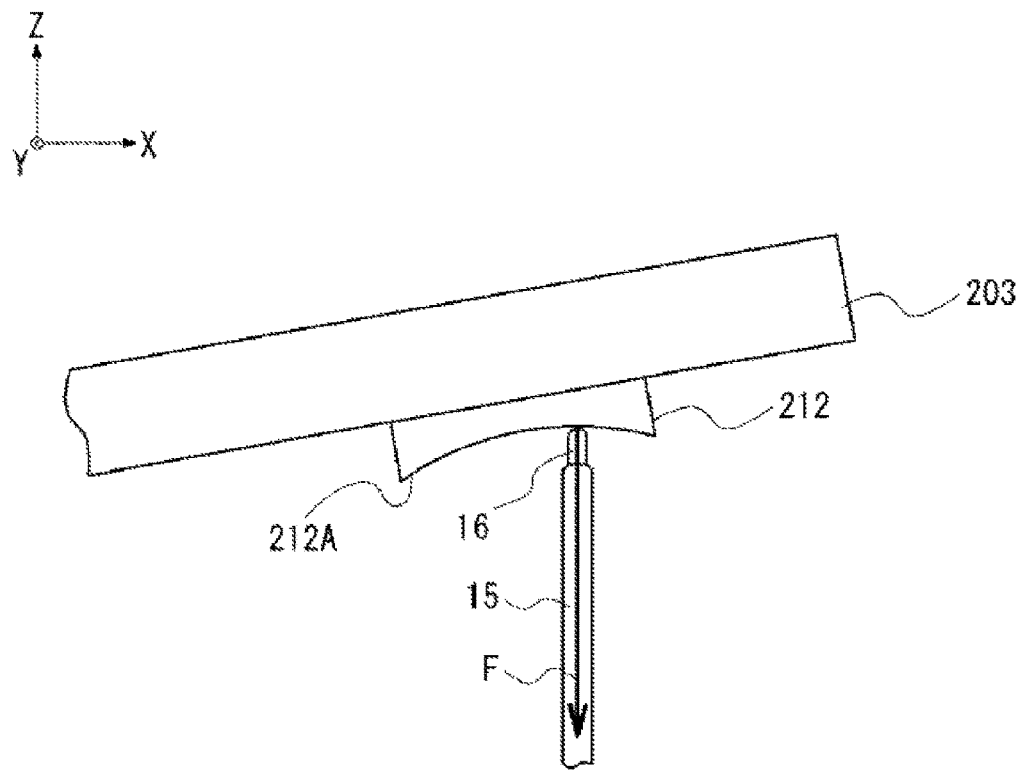
FIG. 12 schematically illustrates a configuration of an inverse posture jig according to a second embodiment.

In response, in the present embodiment, a description is provided of an inverse posture inspection jig 300 having additional improvements to a stylus head receiving member in order to resolve the issue noted above. FIG. 12 illustrates the inverse posture inspection jig 300, which is used to arrange the dial gauge 10 in the inverse posture on the gauge inspection machine 100. The inverse posture inspection jig 300 has a configuration in which the stylus head receiving member 211 of the inverse posture inspection jig 200 according to the first embodiment is replaced with a stylus head receiving member 212. Configurations of the inverse posture inspection jig 300 other than the stylus head receiving member 212 are similar to those of the inverse posture inspection jig 200, and therefore a description thereof is omitted.

The stylus head receiving member 212, similar to the stylus head receiving member 211, is attached to a surface 203A on the vertical direction lower side (Z(−) side) of the columnar member 203. In the present embodiment, the stylus head receiving member 212 has a shape where a surface 212A on the vertical direction lower side (Z(−) side) of the stylus head receiving member 212 is curved toward a vertical direction upper side (Z(+) side) as compared to the stylus head receiving member 211. In this example, the curved bottom surface 212A is configured by an outer circumferential surface of a cylinder with a center axis along the Y direction.

According to this configuration, even when the stylus head receiving member 212 rotates in the counterclockwise direction as the stylus head receiving member 212 displaces toward the vertical direction lower side (Z(−) side), the surface on the vertical direction lower side (Z(−) side) of the stylus head receiving member 212 is perpendicular to the axis of the spindle 15 of the dial gauge 10 at a position where the stylus head receiving member 212 is in contact with the stylus head 16 of the dial gauge 10. As a result, the stylus head receiving member 212 can apply a vertically downward pressing force of a fixed intensity to the spindle 15 of the dial gauge 10 regardless of the amount of vertical direction (Z direction) displacement.

In the present embodiment, when a distance from the jig fixation hole 220 of the jig 300 to the bottom surface 212A of the stylus head receiving member 212 is defined as L, curvature of the bottom surface 212A is preferably 1/L. In such a case, the bottom surface 212A can be brought into contact with the stylus head 16 so as to cancel out rotation direction displacement of the jig 300, which is useful for preventing deterioration of inspection accuracy.

Given the above, the present configuration is capable of preventing deterioration of inspection results that may occur with the inverse posture inspection jig 200, and enables more accurate inspection results to be obtained.

Third Embodiment

Figure 13:
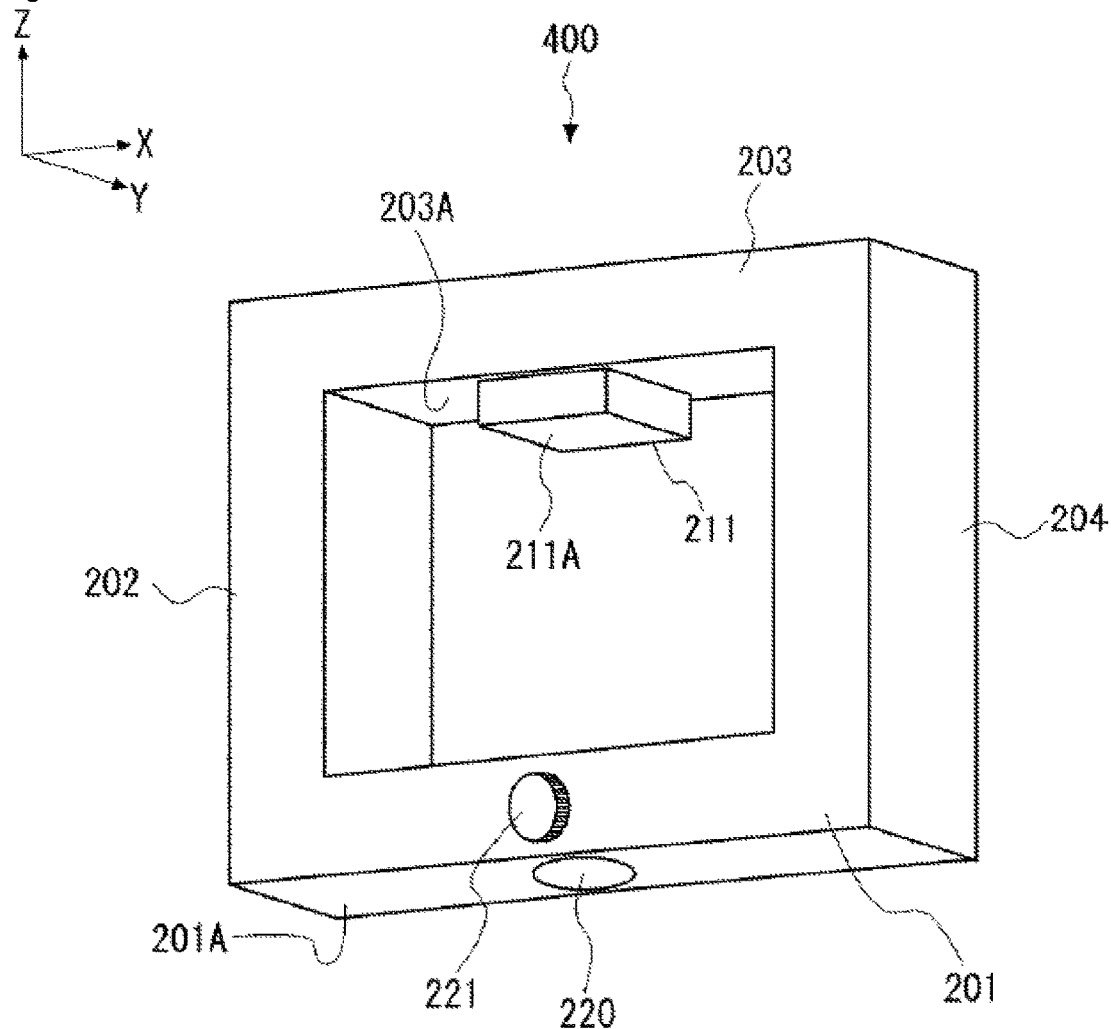
FIG. 13 is a perspective view schematically illustrating a configuration of an inverse posture jig according to a third embodiment.
Figure 14:
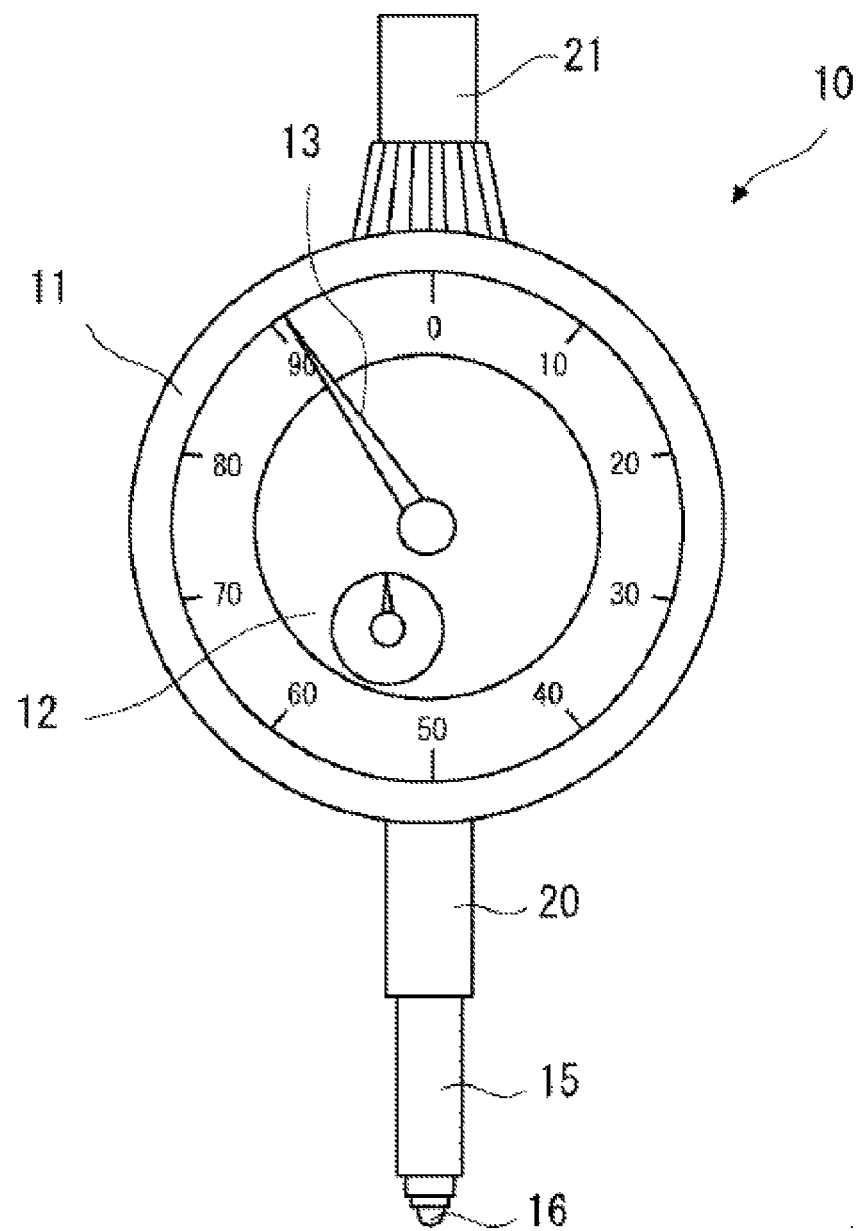
FIG. 14 illustrates the dial gauge.
Figure 15:
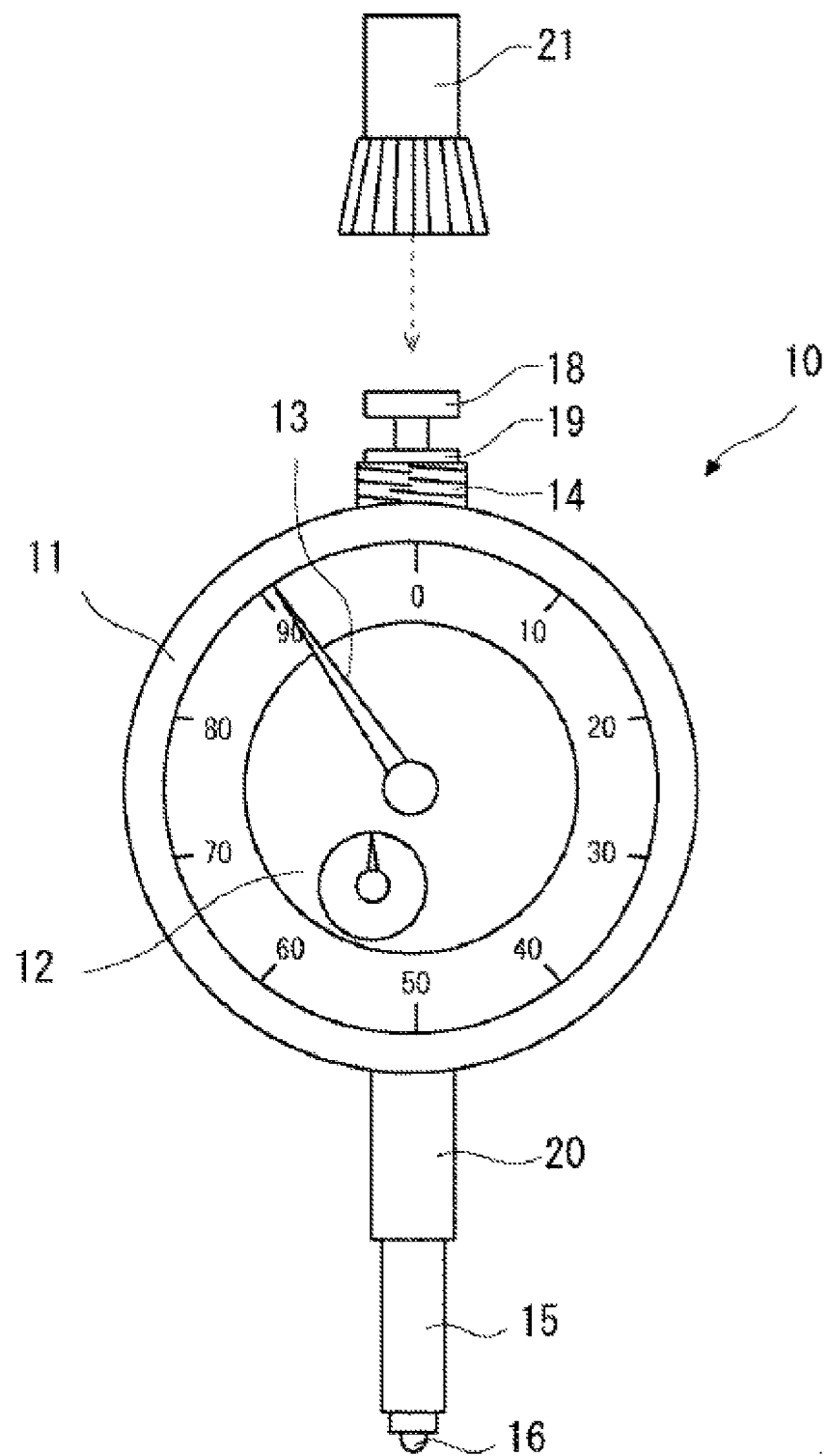
FIG. 15 illustrates the dial gauge.

A description is given of an inverse posture inspection jig 400 according to a third embodiment. FIG. 13 schematically illustrates a configuration of the inverse posture inspection jig 400 according to the third embodiment.

The inverse posture inspection jig 400 has a configuration in which a columnar member 204 is added to the inverse posture inspection jig 200, the columnar member 204 having the same length direction as the columnar member 202. An end portion at the vertical direction upper side (Z(+) side) of the columnar member 204 is joined to an end portion at the X(+) side of the columnar member 203, i.e., to an end portion at an opposite side from the end portion joined to the columnar member 202. The end portion at the vertical direction lower side (Z(−) side) of the columnar member 204 is joined to an end portion at the X(+) side of the columnar member 201, i.e., to an end portion at an opposite side from the end portion joined to the columnar member 202. Accordingly, the columnar members (also referred to columns) 201 to 204 are configured as a continuous annular member. Below, the columnar member 204 is also referred to as a fourth columnar member.

In the present configuration, both end portions of the columnar members 201 and 203 are configured to span the horizontal direction (X direction) between the columnar members 202 and 204, which extend in the vertical direction (Z direction). Therefore, even when the stylus head receiving member 211 mounted to the columnar member 201 and the stylus head 16 make contact, the inverse posture inspection jig 400 is unlikely to shift in the rotation direction. Accordingly, as in the second embodiment, deterioration of inspection accuracy due to fluctuation in the pressing force applied to the spindle 15 of the dial gauge 10 can be prevented.

In the present embodiment, in consideration of the balance of forces applied to the stylus head 16 of the dial gauge 10, the stylus head receiving member 211 and the jig fixation hole 220 are preferably arranged at middle portions of the columnar members 201 and 203, respectively.

Other Embodiments

Moreover, the present invention is not limited to the embodiments described above, and may be modified as needed without departing from the scope of the present invention. For example, in the above-described embodiments, columnar members having a quadrilateral cross-section perpendicular to the length direction were described; however, such descriptions are merely exemplary. The cross-section perpendicular to the length direction of the columnar member may be a polygonal shape other than quadrilateral, or may be round or elliptical.

In the above-described embodiments, an example was described in which the stylus head receiving member 212 according to the second embodiment had a curved surface configured by the outer circumferential surface of a cylinder; however, such description is merely exemplary. The curved surface of the stylus head receiving member 212 may instead be configured by some other curved surface, such as a sphere, for example.

The stylus head receiving member 212 according to the second embodiment can, of course, be applied to the jig 400 according to the third embodiment as well.

It is noted that the foregoing examples have been provided merely for the purpose of explanation and are in no way to be construed as limiting of the present invention.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An inverse posture inspection jig for arranging a gauge on a gauge inspection machine in an inverse posture so as to enable accuracy of the gauge in the inverse posture to be inspected using the gauge inspection machine based on a display value of the gauge when a measurement spindle, provided to the gauge inspection machine so as to be freely raised and lowered, is displaced to a predetermined position, the jig comprising:
    a first column extending in a first direction;
    a second column extending in a second direction orthogonal to the first direction, the second column configured as a cantilever beam protruding in the second direction by a first end of the second column being connected to a first end of the first column;
    a third column extending in the second direction, the third column configured as a cantilever beam protruding in the same direction as the second column by a first end of the third column being connected to a second end of the first column;
    a stylus head receiver connected to the third column such that a surface where a stylus head at a distal end of a spindle of the gauge makes contact faces the second column; and
    a jig fixator provided to the second column and configured to be attachable to the measurement spindle.

2. The jig according to claim 1, wherein a direction in which the measurement spindle displaces on the jig is the first direction.

3. The jig according to claim 2, wherein the surface of the stylus head receiver where the stylus head makes contact is a flat surface.

4. The jig according to claim 2, wherein the surface of the stylus head receiver where the stylus head makes contact is a curved surface that curves toward the third column.

5. The jig according to claim 4, wherein a curvature of the curved surface is the reciprocal of a distance between the jig fixation portion and the curved surface.

6. The jig according to claim 4, wherein the surface of the stylus head receiver where the stylus head makes contact is an outer circumferential surface of a cylinder.

7. The jig according to claim 6, wherein a center axis of the cylinder is orthogonal to the first direction and the second direction.

8. The jig according to claim 4, wherein the surface of the stylus head receiver where the stylus head makes contact is a spherical surface.

9. The jig according to claim 1, wherein:
    the jig further comprises a fourth column extending in the first direction, and
    the first to fourth columns form a single annular member in which a second end of the second column is connected to a first end of the fourth column and a second end of the third column is connected to a second end of the fourth column.

10. The jig according to claim 9, wherein the stylus head receiver and the jig fixation portion are arranged at center positions of the first column and the fourth column.

11. A gauge inspection machine configured to displace a spindle of a gauge and to inspect accuracy of the gauge based on a display value of the gauge when the spindle of the gauge is displaced, the gauge inspection machine comprising:
    a measurement spindle configured to be freely raised and lowered, and further configured to displace the spindle of the gauge; and
    an inverse posture inspection jig configured to position the gauge on the gauge inspection machine in an inverse posture so as to enable inspection of the accuracy of the gauge in the inverse posture, the jig comprising:
        a first column extending in a first direction;
        a second column extending in a second direction orthogonal to the first direction, the second column configured as a cantilever beam protruding in the second direction by a first end of the second column being connected to a first end of the first column;
        a third column extending in the second direction, the third column configured as a cantilever beam protruding in the same direction as the second column by a first end of the third column being connected to a second end of the first column;
        a stylus head receiver joined to the third column such that a surface where a stylus head at a distal end of the spindle of the gauge makes contact faces the second column; and
        a jig fixator provided to the second column and configured to be attachable to the measurement spindle.

* * * * *